United States Patent
Ongarello et al.

(10) Patent No.: US 11,802,079 B2
(45) Date of Patent: Oct. 31, 2023

(54) GLAZING COMPRISING A FUNCTIONAL COATING AND AN ABSORBING COATING HAVING A COLORIMETRIC ADJUSTMENT

(71) Applicant: SAINT-GOBAIN GLASS FRANCE, Courbevoie (FR)

(72) Inventors: Tommaso Ongarello, Le Plessisville-Robinson (FR); Antoine Diguet, Paris (FR); Vincent Chery, Paris (FR); Corentin Monmeyran, Le Raincy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/283,872

(22) PCT Filed: Oct. 17, 2019

(86) PCT No.: PCT/FR2019/052463
§ 371 (c)(1),
(2) Date: Apr. 8, 2021

(87) PCT Pub. No.: WO2020/079375
PCT Pub. Date: Apr. 23, 2020

(65) Prior Publication Data
US 2021/0347685 A1    Nov. 11, 2021

(30) Foreign Application Priority Data

Oct. 18, 2018    (FR) ...................... 1859655

(51) Int. Cl.
*C03C 17/36* (2006.01)
*B32B 17/10* (2006.01)

(52) U.S. Cl.
CPC ...... *C03C 17/366* (2013.01); *B32B 17/10036* (2013.01); *B32B 17/10055* (2013.01); *B32B 17/10211* (2013.01); *B32B 17/10229* (2013.01); *C03C 17/3613* (2013.01); *C03C 17/3626* (2013.01); *C03C 17/3639* (2013.01); *C03C 17/3644* (2013.01); *C03C 17/3649* (2013.01); *C03C 17/3681* (2013.01); *B32B 2255/205* (2013.01); *B32B 2255/28* (2013.01); *B32B 2307/304* (2013.01); *B32B 2307/412* (2013.01); *B32B 2307/418* (2013.01); *B32B 2315/08* (2013.01); *B32B 2419/00* (2013.01); *B32B 2605/006* (2013.01); *B32B 2605/08* (2013.01); *C03C 2218/155* (2013.01); *C03C 2218/156* (2013.01); *C03C 2218/365* (2013.01)

(58) Field of Classification Search
CPC .......... B32B 17/1022; B32B 17/10229; E06B 3/66–6722; C03C 17/366; C03C 17/3644; C03C 17/3681; C03C 17/3647; C03C 17/3642; C03C 17/3639; C03C 17/3649
See application file for complete search history.

(56) References Cited

U.S. PATENT DOCUMENTS

| | | | | |
|---|---|---|---|---|
| 4,487,197 A | * | 12/1984 | Hoyois | C03C 17/3681 359/360 |
| 4,955,705 A | * | 9/1990 | Nakajima | G02B 5/0858 359/603 |
| 5,543,229 A | * | 8/1996 | Ohsaki | C03C 17/36 428/432 |
| 6,416,872 B1 | * | 7/2002 | Maschwitz | G02B 1/10 428/428 |
| 2003/0049463 A1 | * | 3/2003 | Wang | C03C 17/3423 428/432 |
| 2004/0053068 A1 | * | 3/2004 | Schicht | C03C 17/36 428/632 |
| 2005/0069717 A1 | * | 3/2005 | Stachowiak | C03C 17/366 204/192.27 |
| 2008/0070045 A1 | * | 3/2008 | Barton | C03C 17/36 428/411.1 |
| 2012/0164443 A1 | * | 6/2012 | Durandeau | C03C 17/3618 428/428 |
| 2012/0177899 A1 | * | 7/2012 | Unquera | C03C 17/3618 428/428 |
| 2014/0063582 A1 | | 3/2014 | Gross et al. | |
| 2014/0377580 A1 | * | 12/2014 | Manz | C03C 17/3652 428/457 |
| 2016/0002101 A1 | * | 1/2016 | Mahieu | C03C 17/3681 359/359 |
| 2017/0088461 A1 | * | 3/2017 | Tavares-Cortes | C03C 17/3639 |
| 2017/0114588 A1 | * | 4/2017 | Fukuda | C03C 17/3681 |
| 2017/0197874 A1 | * | 7/2017 | Dumont | C03C 17/3681 |
| 2017/0210096 A1 | * | 7/2017 | Dumont | B32B 17/10293 |
| 2017/0240462 A1 | * | 8/2017 | Wagner | C03C 17/366 |
| 2018/0095208 A1 | * | 4/2018 | Diguet | G02B 5/0875 |
| 2018/0105459 A1 | * | 4/2018 | Dalapati | C03C 17/366 |
| 2019/0002341 A1 | * | 1/2019 | Mahieu | C03C 17/3663 |
| 2019/0043640 A1 | * | 2/2019 | Ganjoo | H01B 5/14 |
| 2019/0330100 A1 | * | 10/2019 | Soon | C03C 17/3681 |

(Continued)

FOREIGN PATENT DOCUMENTS

FR    2 858 816 A1    2/2005
WO    WO 2006/043026 A1    4/2006

(Continued)

OTHER PUBLICATIONS

International Search Report as issued in International Patent Application No. PCT/FR2019/052463, dated Dec. 20, 2019.

*Primary Examiner* — Z. Jim Yang
(74) *Attorney, Agent, or Firm* — Pillsbury Winthrop Shaw Pittman LLP

(57) ABSTRACT

A material includes one or more transparent substrates including two main faces, wherein one of the faces of one of the substrates is coated with a functional coating which can have an effect on solar radiation and/or infrared radiation, and a face not coated with the functional coating of one of the substrates includes an absorbent color-adjustment coating including an absorbent layer which absorbs solar radiation in the visible part of the spectrum.

25 Claims, No Drawings

(56) References Cited

U.S. PATENT DOCUMENTS

2019/0345754 A1* 11/2019 Singel ................... E06B 3/6715
2019/0382306 A1* 12/2019 Biswas ............... C03C 17/3618
2020/0131084 A1*  4/2020 Myli .................. C03C 17/3681
2021/0340061 A1* 11/2021 Wanakule ............... C03C 17/22

FOREIGN PATENT DOCUMENTS

| WO | WO 2014/207171 A1 | 12/2014 | | |
| WO | WO-2017108366 A1 * | 6/2017 | ............. | C03C 17/36 |
| WO | WO-2018075440 A2 * | 4/2018 | ....... | B32B 17/10036 |

* cited by examiner

GLAZING COMPRISING A FUNCTIONAL COATING AND AN ABSORBING COATING HAVING A COLORIMETRIC ADJUSTMENT

CROSS-REFERENCE TO RELATED APPLICATIONS

This application is the U.S. National Stage of PCT/FR2019/052463, filed Oct. 17, 2019, which in turn claims priority to French patent application number 1859655 filed Oct. 18, 2018. The content of these applications are incorporated herein by reference in their entireties.

The invention relates to a material comprising a transparent substrate coated with a functional coating which can have an effect on solar radiation and/or infrared radiation. The invention also relates to glazings comprising these materials and also to the use of such materials for manufacturing thermal insulation and/or solar protection glazings.

In the continuation of the description, the term "functional" describing "functional coating" means "which can have an effect on solar radiation and/or infrared radiation".

These glazings may be intended to equip both buildings and vehicles, in particular with a view to:
  reducing the air-conditioning load and/or preventing excessive overheating, which glazings are known as "solar control" glazings, and/or
  reducing the amount of energy dissipated toward the outside, which glazings are known as "low-e" glazings.

Depending on the climates of the countries where these glazings are installed, in particular depending on the levels of sunshine, the desired performance qualities in terms of light transmission and of solar factor can vary. Consequently, different glazing ranges characterized by their level of light transmission are developed.

For example, in countries with high levels of sunshine, there is a great demand for glazing having a light transmission of the order of 40% and sufficiently low solar factor values. In countries with lower levels of sunshine, a higher light transmission is desired.

The selectivity "S" makes it possible to evaluate the performance of these glazings. It corresponds to the ratio of the light transmission $LT_{vis}$ in the visible region of the glazing to the solar factor SF of the glazing ($S=LT_{vis}/SF$). The solar factor "SF or g" corresponds to the ratio in % of the total energy entering the space through the glazing to the incident solar energy.

Obtaining a high selectivity must not be carried out to the detriment of the esthetic appearance and in particular of the color. In general, it is sought to obtain an appearance that is as neutral as possible in external and internal reflection and in transmission.

The conventional approach to obtaining both high selectivity and excellent color neutrality consists in developing increasingly sophisticated functional coatings.

Known selective glazings comprise transparent substrates coated with a functional coating comprising a stack of several metallic functional layers, each placed between two dielectric coatings. Such glazings make it possible to improve solar protection while retaining a high light transmission. These functional coatings are generally obtained by a sequence of depositions carried out by sputtering, optionally assisted by a magnetic field.

Conventionally, the faces of a glazing are denoted from the outside of the building and by numbering the faces of the substrates from the outside toward the inside of the passenger compartment or space equipped with it. This means that the incident sunlight passes through the faces in increasing numerical order thereof.

Known selective glazings are in general double glazings comprising the functional coating located on face 2, i.e. on the outermost substrate of the building; on its face facing the intermediate gas-filled space.

Adapting the colorimetry of these glazings is obtained by acting on the nature and/or the thicknesses of the layers or coatings constituting the functional coatings.

The invention specifically relates to highly selective glazings comprising silver-based complex functional coatings.

Indeed, silver-based functional coatings generally perform better in terms of selectivity compared to other known infrared-reflecting functional coatings such as coatings comprising layers based on a conductive oxide.

On the other hand, these silver-based functional coatings are described as complex due to the number of layers constituting them, due to the nature of the materials constituting these layers and due to the adjustment of the thickness of these layers.

However, the complexity of the functional coatings makes it difficult to jointly obtain good thermal performance and a particular esthetic appearance, for example excellent color neutrality or obtaining a particular color.

This difficulty in obtaining excellent color neutrality is even more marked for glazings having a light transmission of the order of 50% because they are intrinsically more colored than glazings having a higher or lower light transmission. Indeed, for very low or very high light transmissions for which the lightness is close to 0 or 100, the color perception is less intense. The colors "converge" toward black and white.

Finally, the complexity of these functional coatings also makes it difficult to maintain a constant production quality for a given functional coating. Indeed, by multiplying the number of layers and materials constituting these functional coatings, it is increasingly difficult to adapt the settings of the deposition conditions in order to obtain functional coatings of identical color originating from two batches produced on the same production site or two batches produced on two different production sites.

The aim of the invention is therefore to overcome these drawbacks by developing a glazing having both good thermal performance, while guaranteeing the desired esthetic appearance.

The objective targeted by the invention is therefore to easily obtain a whole range of glazing having both high selectivity and a particular esthetic appearance, for example excellent color neutrality or obtaining a particular color.

The applicant has developed a new solution that makes it possible to adapt the colorimetry of glazings comprising functional coatings without making these functional coatings more complex.

The proposed solution consists in adding an absorbent color-adjustment coating, which absorbs solar radiation in the visible part of the spectrum, on one of the faces of a substrate of the glazing, said face not comprising the functional coating.

The invention relates to a material comprising one or more transparent substrates, each substrate comprising two main faces, characterized in that:
  one of the faces of one of the substrates is coated with a functional coating which can have an effect on solar radiation and/or infrared radiation, and
  a face not coated with the functional coating of one of the substrates comprises an absorbent color-adjustment coating comprising an absorbent layer which absorbs solar radiation in the visible part of the spectrum.

The invention relates in particular to a material comprising a transparent substrate comprising two main faces, characterized in that:
one of the faces of the substrate is coated with a functional coating which can have an effect on solar radiation and/or infrared radiation,
the other face of the substrate is coated with an absorbent color-adjustment coating comprising an absorbent layer which absorbs solar radiation in the visible part of the spectrum.

The invention relates in particular to a material (or system) comprising:
a transparent substrate comprising two main faces, of which one of the faces of the substrate is coated with a functional coating which can have an effect on solar radiation and/or infrared radiation, and
an additional substrate comprising at least two main faces, characterized in that:
at least one face not coated with the functional coating of one of the substrates comprises an absorbent color-adjustment coating comprising an absorbent layer which absorbs solar radiation in the visible part of the spectrum,
said face is chosen from:
the other uncoated face of the substrate coated with a functional coating,
one of the faces of an additional substrate.

The invention also relates to:
a glazing comprising a material according to the invention,
a glazing comprising a material according to the invention mounted on a vehicle or on a building, and
the process for preparing a material or a glazing according to the invention,
the use of a glazing according to the invention as solar control and/or low-emissivity glazing for the construction industry or vehicles,
a building, a vehicle or a device comprising a glazing according to the invention.

Preferably, the absorbent color-adjustment coating is a neutralizing coating, that is to say that it gives the material, or the glazing comprising it, neutral colors.

However, in certain particular applications, other colors are sometimes desired, in particular a blue-green, bronze or silver appearance. The solution of the invention makes it possible to easily obtain these various colors.

The solution of the invention therefore proposes using standard or existing functional coatings, i.e. coatings that are not optimized in order to improve colorimetry, and to improve or modify their appearance by adding an absorbent color-adjustment coating on another face of a substrate constituting the glazing.

This solution separates the obtaining of energy performance (selectivity, emissivity, etc.), largely ensured by the functional coating, and the obtaining of the esthetic appearance, ensured by the absorbent color-adjustment coating. The absorbent color-adjustment coating affects the energy performance but to a lesser extent.

The absorbent color-adjustment coating has a less complex structure in terms of the number and thickness of layers than the functional coating. Consequently, the solution of the invention thus makes it possible to obtain a whole color panel more easily compared to the solutions that optimize the functional coatings.

Finally, the solution of the invention has the additional advantage, starting from one and the same functional coating of high light transmission, of obtaining a whole range of glazing of lower light transmission and/or of varied color. It is no longer necessary to develop for each light transmission range a complex functional coating that has both energy performance and colorimetric properties. Starting from the same complex functional coating, it is sufficient to select the absorbent color-adjustment coating of less complex structure that enables the desired colors to be obtained.

Preferably, a material or a glazing according to the invention is configured with the absorbent color-adjustment coating positioned on face 1 and the functional coating positioned on face 2.

This configuration is particularly advantageous because, in external reflection, the colored double reflections when the coatings are on two different substrates are thus avoided.

The material according to the invention may be in the form of monolithic, laminated and/or multiple glazing, in particular double glazing or triple glazing.

A monolithic glazing comprises a material comprising a transparent substrate. Face 1 is outside the building and thus constitutes the external wall of the glazing and face 2 is inside the building and thus constitutes the internal wall of the glazing.

A multiple glazing comprises a material and at least one additional substrate, the material and the additional substrate are separated by at least one intermediate gas-filled space. The glazing provides a separation between an external space and an internal space.

A double glazing, for example, comprises 4 faces; face 1 is outside the building and thus constitutes the external wall of the glazing and face 4 is inside the building and thus constitutes the internal wall of the glazing, faces 2 and 3 being inside the double glazing.

A laminated glazing comprises a material and at least one additional substrate, the material and the additional substrate are separated by at least one lamination interlayer. A laminated glazing therefore comprises at least one structure of material/lamination interlayer/additional substrate type. In the case of a laminated glazing, all the faces of the materials and additional substrates are numbered and the faces of the lamination interlayers are not numbered. Face 1 is outside the building and thus constitutes the external wall of the glazing and face 4 is inside the building and thus constitutes the internal wall of the glazing, faces 2 and 3 being in contact with the lamination interlayer.

A laminated and multiple glazing comprises a material and at least two additional substrates corresponding to a second substrate and a third substrate, the material and the third substrate are separated by at least one intermediate gas-filled space, and
the material and the second substrate or
the second substrate and the third substrate,
are separated by at least one lamination interlayer.

In the case of a multiple and/or laminated glazing, the reflective color-adjustment coating is preferably positioned on face 1 and the functional coating which can have an effect on solar radiation and/or infrared radiation is positioned on face 2 or 3.

All the light characteristics described are obtained according to the principles and methods of the European standard EN 410 relating to the determination of the light and solar characteristics of the glazings used in the glass for the construction industry.

Conventionally, the refractive indices are measured at a wavelength of 550 nm.

The light characteristics are measured according to the D65 illuminant at 2° perpendicularly to the material fitted in a double glazing (unless otherwise indicated):
- LT corresponds to the light transmission in the visible region in %,
- Rext corresponds to the external light reflection in the visible region in %, with the observer on the external space side,
- Rint corresponds to the internal light reflection in the visible region in %, with the observer on the internal space side,
- a*T and b*T correspond to the colors in transmission a* and b* in the L*a*b* system,
- a*Rext and b*Rext correspond to the colors in reflection a* and b* in the L*a*b* system, the observer on the external space side,
- a*Rint and b*Rint correspond to the colors in reflection a* and b* in the L*a*b* system, the observer on the internal space side, Unless otherwise indicated, the colorimetric properties such as the values L*, a* and b* and all the values and ranges of values of the optical and thermal characteristics such as the selectivity, the external or internal light reflection, the light transmission are calculated with:
- materials comprising a substrate coated with a functional coating that are mounted in a double glazing,
- the double glazing has a configuration: 6-16(Ar-90%)-4, that is to say a configuration consisting of a material comprising a substrate of the ordinary soda-lime glass type of 4 mm and of another glass substrate of the soda-lime glass type of 4 mm; the two substrates are separated by an intermediate gas-filled space comprising 90% argon and 10% air with a thickness of 16 mm,
- the functional coating is preferably positioned on face 2.

An objective of the invention may be to obtain an exceptionally neutral appearance in external and internal reflection and in transmission. Preferably, neutrality in external reflection is favored. According to the invention, neutral tints in external reflection, in internal reflection or in transmission are defined by:
- values of a*, in ascending order of preference, of between −5 and +5, between −4 and +4, between −3 and +3, between −2 and +2, between −1 and +1;
- values of b*, in ascending order of preference, of between −5 and +5, between −4 and +4, between −3 and +3, between −2 and +2, between −1 and +1.

Another objective of the invention may be to obtain colors in external reflection in the blue or blue-green range. "Colors in the blue-green range" correspond to negative values for a* and b* in the L*a*b* color measurement system. a* is between −10.0 and 0.0, preferably between −5.0 and 0.0 and b* is between −10.0 and 0.0, preferably between −5.0 and 0.0.

The glazings according to the invention are fitted to a building or a vehicle.

The invention therefore also relates to:
- a glazing fitted to a vehicle or to a building, and
- a vehicle or a building comprising a glazing according to the invention.

A glazing for the construction industry generally delimits two spaces: a space described as "outside" and a space described as "inside". It is considered that the sunlight entering a building goes from the outside toward the inside.

The functional coating is either located:
- on face 2, i.e. on the outermost substrate of the building; on its face facing the intermediate gas-filled space,
- on face 3, i.e. on the innermost substrate of the building; on its face facing the intermediate gas-filled space.

Preferably, the absorbent color-adjustment coating is positioned on face 1 and the functional coating which can have an effect on solar radiation and/or infrared radiation is positioned on face 2.

According to advantageous embodiments, the material of the invention, in the form of a double glazing comprising the functional coating positioned on face 2, makes it possible in particular to achieve the following performance results:
- a light transmission of between 40% and 60%, and/or
- values of a* and b* in external reflection of, in increasing order of preference, between −5 and +5, between −4 and +4, between −3 and +3, between −2 and +2, between −1 and +1, and/or
- values of a* and b* in internal reflection of, in increasing order of preference, between −5 and +5, between −4 and +4, between −3 and +3, between −2 and +2, between −1 and +1, and/or
- values of a* and b* in transmission of, in increasing order of preference, between −5 and +5, between −4 and +4, between −3 and +3, between −2 and +2, between −1 and +1.

Such double glazing has neutral colors.

According to another advantageous embodiment, when the material is fitted in a double glazing with the functional coating positioned on face 2, the double glazing has:
- values of a* in external reflection of, in increasing order of preference, between −10 and −3,
- values of b* in external reflection of, in increasing order of preference, between −20 and −10.

Such double glazing has a blue color.

According to another advantageous embodiment, when the material is fitted in a double glazing with the functional coating positioned on face 2, the double glazing has values of a* and b* in external reflection of between 5 and 20.

Such double glazing has a bronze color.

In a double glazing configuration, the present invention makes it possible to obtain a high selectivity S, in particular of greater than 1.6, indeed even of greater than 1.7, a solar factor (SF) of less than 30%, neutral colors in transmission and in external and internal reflection.

The invention also relates to:
- the process for obtaining a material or a glazing according to the invention,
- the use of a glazing according to the invention as solar control and/or low-emissivity glazing for the construction industry or vehicles.

The functional coating and/or the absorbent color-adjustment coating are deposited by magnetic-field-assisted sputtering (magnetron process). According to this advantageous embodiment, all the layers of the coatings are deposited by magnetic-field-assisted sputtering.

The invention also relates to the process for obtaining a material and a glazing according to the invention, in which the layers of the coatings are deposited by magnetron sputtering.

The preferred characteristics which appear in the remainder of the description are applicable both to the material and to the glazing according to the invention and, where appropriate, to the process, to the use, to the building or to the vehicle according to the invention.

Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

In the present description, unless otherwise indicated, the expression "based on", used to describe a material or a layer with regard to what it contains, means that the fraction by weight of the constituent which it comprises is at least 50%, in particular at least 70%, preferably at least 90%.

In order to determine, for a glazing comprising a known functional coating, which absorbent color-adjustment coating makes it possible to obtain the desired thermal and colorimetric properties, it is possible, by means of numerical simulations, to identify which absorbent color-adjustment coatings can be used.

Unless otherwise mentioned, the thicknesses touched on in the present document, without other information, are real or geometrical physical thicknesses denoted Ep and are expressed in nanometers (and not optical thicknesses). The optical thickness Eo is defined as the physical thickness of the layer under consideration multiplied by its refractive index at the wavelength of 550 nm: Eo=n*Ep. As the refractive index is a dimensionless value, it may be considered that the unit of the optical thickness is that chosen for the physical thickness.

According to the invention, a dielectric coating corresponds to a sequence of layers comprising at least one dielectric layer. If a dielectric coating is composed of several dielectric layers, the optical thickness of the dielectric coating corresponds to the sum of the optical thicknesses of the different dielectric layers constituting the dielectric coating.

According to the invention, an absorbent color-adjustment coating is a coating which changes the color of the material or a glazing comprising a functional coating. The color adjustment is achieved through the use of an absorbent layer.

According to the invention, an absorbent layer which absorbs solar radiation in the visible part of the spectrum is a layer which absorbs certain wavelengths in the visible region. The optical index of an absorbent layer can be broken down into a real part and an imaginary part. The real part, n, corresponds to the refractive index. The imaginary part or attenuation factor k, is related to the absorption of light by the layer.

The term "absorbent layer" within the meaning of the present invention, is understood to mean a layer made of a material having an n/k ratio between 0 and 5, excluding these values, over at least 60%, preferably at least 80%, indeed even 100%, of the wavelength range of the visible region (from 380 nm to 780 nm). 100% means that the material has an n/k ratio between 0 and 5 for all the wavelengths of the range. n denotes the real refractive index of the material at a given wavelength and k represents the imaginary part of the refractive index at a given wavelength, the n/k ratio being calculated at the same given wavelength for both n and k.

The absorption of light energy in an absorbent coating depends simultaneously on the nature of the absorbent layer, on the thickness and on the material constituting it, but also on its position in the coating. In addition, an absorbent material changes the reflection to a certain extent. It is therefore possible to selectively increase or reduce the absorption and reflection properties of the glazing for certain wavelengths. The color of the glazing is adapted by acting on this absorption and on this reflection.

According to the invention:
the light reflection corresponds to the reflection of solar radiation in the visible part of the spectrum,
the light transmission corresponds to the transmission of solar radiation in the visible part of the spectrum,
the light absorption corresponds to the absorption of solar radiation in the visible part of the spectrum.

According to the invention, the light absorption due to the absorbent layer, measured on the glass side by depositing only this absorbent layer enclosed between two non-absorbent dielectric layers on ordinary clear glass of 4 mm to 6 mm thick, is
greater than 5%, indeed even greater than 10%, or
between 5% and 65%, between 5% and 55%, between 10% and 45%, preferably between 10% and 35%.

The absorbent layer is chosen from:
layers based on one or more metals and/or metalloids,
layers of nitride of one or more metals and/or metalloids,
layers of oxynitride of one or more metals and/or metalloids,
of elements chosen from palladium, niobium, tungsten, iron in particular in the form of stainless steel, titanium, chromium, molybdenum, zirconium, nickel, tantalum, zinc, tin and silicon.

The absorbent layer can be essentially in elemental metal or metalloid form. According to the invention, a material in elemental form means that this material is not deliberately combined or bonded to another element such as oxygen, nitrogen or carbon. This means, for example, that this material is neither in oxide, nitride or carbide form.

Although essentially in elemental form, the metal or the metalloid may have traces of nitridation due to the deposition atmosphere contaminated by nitrogen from the neighboring deposition zones. The absorbent layer may be a layer of a metal or of a metalloid chosen from silicon, palladium, niobium, tungsten, stainless steel, titanium, chromium, molybdenum, zirconium, nickel, tantalum, zinc or alloys of these elements, such as NiCr, NiCrW, WTa, WCr, NbZr, TaNiV, CrZr and NbCr.

The absorbent layer can be a nitride or a subnitride, that is to say a nitride substoichiometric in nitrogen. Preferably, the absorbent layer is a layer of nitride chosen from SnZnN, TiN, NiCrWN, NiVN, TaN, CrN, ZrN, CrZrN, TiAlN, TiZrN, WN, SiZrN and SiNiCrN.

According to the preferred embodiments, the absorbent layer is chosen from a layer of nickel and/or chromium nitride, a layer of titanium nitride, a layer of niobium nitride or a layer based on silicon.

The layer based on nickel chromium nitride has, in increasing order of preference, a nickel to chromium weight ratio of between 90/10 and 70/30, preferably an 80/20 ratio.

The thickness of the absorbent layer is, in increasing order of preference, from 0.1 to 20 nm, 0.2 to 10 nm, from 0.3 to 8 nm, from 0.5 to 5 nm, from 1.0 to 4 nm, from 1.5 to 3.0 nm.

The absorbent nature of the color-adjustment layer has the effect that this layer necessarily reduces the light transmission of the material or of the glazing comprising it.

To mitigate this effect, it is possible to add dielectric coatings comprising dielectric layers, the materials and thicknesses of which are judiciously chosen, to the absorbent layer. For example, the absorbent layer may be positioned between two dielectric coatings comprising dielectric layers with high and low refractive indices making it possible, to a certain extent, to adjust the light transmission and the absorption.

These dielectric coatings also make it possible to protect the absorbent layer.

The absorbent color-adjustment coating may comprise a dielectric coating and an absorbent layer.

The absorbent color-adjustment coating may comprise, starting from the substrate:
optionally a lower dielectric coating,
an absorbent layer,
an upper dielectric coating.

The absorbent color-adjustment coating may comprise, starting from the substrate:
optionally a lower dielectric coating,
an absorbent layer,
an intermediate dielectric coating,
an absorbent layer,
an upper dielectric coating.

The dielectric coatings of the absorbent color-adjustment coating may satisfy one or more of the following characteristics:
the intermediate or upper dielectric coating comprises a high-index layer having a refractive index, in increasing order of preference, of greater than 1.85, greater than 1.90, greater than 2.00, greater than 2.10, greater than 2.20, and/or
the intermediate or upper dielectric coating comprises a low-index layer having a refractive index, in increasing order of preference, of less than 1.75, less than 1.60, or less than 1.50, and/or
the intermediate or upper dielectric coating comprises a sequence of at least two dielectric layers, of which the variation in refractive index between at least two layers is, in increasing order of preference, greater than 0.2, greater than 0.4, greater than 0.5, greater than 0.6, greater than 0.7, greater than 0.8 and/or
the intermediate or upper dielectric coating comprises a sequence of at least two dielectric layers including:
a low-index layer having a refractive index of less than 1.75, preferably less than 1.60, indeed even less than 1.50 and
a high-index layer having a refractive index, in increasing order of preference, of greater than 1.85, greater than 1.90, greater than 2.00, greater than 2.10, greater than 2.20, greater than 2.30, and/or
the intermediate or upper dielectric coating comprises a low-index layer located below a high-index layer, and/or
the lower dielectric coating comprises a high-index layer having a refractive index, in increasing order of preference, of greater than 1.85, greater than 1.90, greater than 2.00, greater than 2.10, greater than 2.20, and/or
the lower dielectric coating comprises a low-index layer having a refractive index, in increasing order of preference, of less than 1.75, less than 1.60, or less than 1.50, and/or
the lower dielectric coating comprises a sequence of at least two dielectric layers, of which the variation in refractive index between at least two layers is, in increasing order of preference, greater than 0.2, greater than 0.4, greater than 0.5, greater than 0.6, greater than 0.7, greater than 0.8 and/or
the lower dielectric coating comprises a sequence of at least two dielectric layers including:
a high-index layer having a refractive index, in increasing order of preference, of greater than 1.85, greater than 1.90, greater than 2.00, greater than 2.10, greater than 2.20,
a low-index layer having a refractive index of less than 1.75, preferably less than 1.60, indeed even less than 1.50, and/or
the lower dielectric coating comprises a high-index layer located below a low-index layer.

The layers with a high refractive index preferably have a refractive index strictly greater than 1.85, greater than 1.90, strictly greater than 2.00, and more preferably greater than or equal to 2.30. These layers may be based on titanium oxide or on a mixed oxide of titanium and another component chosen from the group consisting of Zn, Zr and Sn, or based on zirconium oxide or based on niobium oxide or based on a mixed nitride of silicon and zirconium, or based on a mixed nitride of silicon, zirconium and aluminum.

The high-index layers according to the invention can be chosen from:
a layer of zinc oxide (index at 550 nm: about 1.95),
a layer of zinc tin oxide (index at 550 nm: about 2.04),
a layer of silicon nitride $Si_3N_4$ (index at 500 nm: about 2.06),
a layer of tungsten oxide $WO_3$ (index at 550 nm: about 2.15),
a layer of manganese oxide $MnO$ (index at 550 nm: about 2.16),
a layer of silicon zirconium nitride (index at 550 nm: between about 2.15 and 2.55),
a layer of niobium oxide $Nb_2O_5$ (index at 550 nm: about 2.30),
a layer of titanium oxide $TiO_2$ (index at 500: about 2.45),
a layer of zirconium nitride $Zr_3N_4$ (index at 550 nm: about 2.55),
a layer of bismuth oxide $Bi_2O_3$ (index at 550 nm: about 2.60).

The layers with a low refractive index consist essentially of silicon oxide.

The choice of an absorbent layer also adds flexibility to the design by raising the degeneracy of the reflection spectra of each side of a non-absorbent coating.

The material according to the invention may also comprise several color-adjustment coatings. According to this embodiment, the material comprises at least two color-adjustment coatings comprising an absorbent layer, each located on different faces of one of the substrates, excluding the face(s) coated with the functional coating.

To obtain a glazing belonging to a certain light transmission range, a functional coating belonging to a higher light transmission range is chosen, to which the absorbent color-adjustment coating is added.

The functional coating may comprise one or more metallic functional layers, preferably based on silver, each positioned between two dielectric coatings. The functional coating may in particular comprise one, two, three or four metallic functional layers. According to these embodiments:
the functional coating comprises at least one silver-based metallic functional layer, or
the functional coating comprises at least two silver-based metallic functional layers, or
the functional coating comprises at least three silver-based metallic functional layers.

The silver-based metallic functional layers comprise at least 95.0%, preferably at least 96.5% and better still at least 98.0% by weight of silver, relative to the weight of the functional layer. Preferably, a silver-based metallic functional layer comprises less than 1.0% by weight of metals other than silver, with respect to the weight of the silver-based metallic functional layer.

Preferably, the thicknesses of the metallic functional layers starting from the substrate increase. The increase in thickness between two successive functional layers is greater than 0.8 nm, greater than 1 nm, greater than 2 nm, greater than 3 nm or greater than 4 nm.

According to advantageous embodiments of the invention, the functional metallic layers satisfy one or more of the following conditions:
- the ratio of the thickness between two successive functional layers is between 1.05 and 2.30, including these values,
- the thickness of each metallic functional layer is between 6 and 20 nm.

The stack may further comprise at least one blocking layer located in contact with a metallic functional layer.

The blocking layers conventionally have the role of protecting the functional layers from possible damage during the deposition of the upper antireflective coating and during a possible high-temperature heat treatment of the annealing, bending and/or tempering type.

The blocking layers are chosen from metallic layers based on a metal or on a metal alloy, metal nitride layers, metal oxide layers and metal oxynitride layers of one or more elements chosen from titanium, nickel, chromium and niobium, such as a layer of Ti, TiN, TiO$_x$, Nb, NbN, Ni, NiN, Cr, CrN, NiCr or NiCrN. When these blocking layers are deposited in the metal, nitride or oxynitride form, these layers can undergo a partial or complete oxidation according to their thickness and the nature of the layers which frame them, for example, during the deposition of the following layer or by oxidation in contact with the underlying layer.

According to advantageous embodiments of the invention, the blocking layer or layers satisfy one or more of the following conditions:
- each functional metal layer is in contact with at least one blocking layer chosen from a blocking underlayer and a blocking overlayer, and/or
- each functional metal layer is in contact with a blocking overlayer, and/or
- the thickness of each blocking layer is at least 0.1 nm, preferably between 0.2 and 2.0 nm.

According to the invention, the blocking layers are considered not to be part of a dielectric coating. This means that their thickness is not taken into account in the calculation of the optical thickness of the dielectric coating located in contact with them.

"Dielectric layer", within the meaning of the present invention, should be understood as meaning that, from the viewpoint of its nature, the material is "nonmetallic", that is to say is not a metal. In the context of the invention, this term denotes a material exhibiting an n/k ratio over the entire wavelength range of the visible region (from 380 nm to 780 nm) equal to or greater than 5.

The dielectric layers of the coatings exhibit the following characteristics, alone or in combination:
- they are deposited by magnetic-field-assisted sputtering,
- they are chosen from the oxides or nitrides of one or more elements chosen from titanium, silicon, aluminum, zirconium, tin and zinc,
- they have a thickness of greater than 2 nm, preferably of between 4 and 100 nm.

According to advantageous embodiments of the invention, the dielectric coatings of the functional coatings satisfy one or more of the following conditions:
- the dielectric layers can be based on an oxide or nitride of one or more elements chosen from silicon, zirconium, titanium, aluminum, tin, zinc, and/or
- at least one dielectric coating comprises at least one dielectric layer having a barrier function, and/or
- each dielectric coating comprises at least one dielectric layer having a barrier function, and/or
- the dielectric layers having a barrier function are based on compounds of silicon and/or aluminum chosen from oxides, such as SiO$_2$ and Al$_2$O$_3$, silicon nitrides Si$_3$N$_4$ and AlN, and oxynitrides SiO$_x$N$_y$ and AlO$_x$N$_y$, based on zinc tin oxide or based on titanium oxide,
- the dielectric layers having a barrier function are based on compounds of silicon and/or aluminum optionally comprise at least one other element, such as aluminum, hafnium and zirconium, and/or
- at least one dielectric coating comprises at least one dielectric layer having a stabilizing function, and/or
- each dielectric coating comprises at least one dielectric layer having a stabilizing function, and/or
- the dielectric layers having a stabilizing function are preferably based on an oxide chosen from zinc oxide, tin oxide, zirconium oxide or a mixture of at least two thereof, and/or
- the dielectric layers having a stabilizing function are preferably based on crystalline oxide, in particular based on zinc oxide, optionally doped using at least one other element, such as aluminum, and/or
- each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide.

Preferably, each dielectric coating consists solely of one or more dielectric layers. Preferably, there is thus no absorbing layer in the dielectric coatings, in order not to reduce the light transmission.

If a dielectric coating of a functional coating comprises an absorbent layer for which the refractive index at 550 nm comprises an imaginary part of the dielectric function that is non-zero (or non-negligible), for example a metallic layer, the thickness of this layer is not taken into account for the calculation of the optical thickness.

The dielectric layers can exhibit a barrier function. Dielectric layers having a barrier function (hereinafter barrier layer) is understood to mean a layer made of a material capable of forming a barrier to the diffusion of oxygen and water at high temperature, originating from the ambient atmosphere or from the transparent substrate, toward the functional layer. Such dielectric layers are chosen from the layers:
- based on compounds of silicon and/or aluminum chosen from oxides such as SiO$_2$ and Al$_2$O$_3$, nitrides such as nitrides such as Si$_3$N$_4$ and AlN, and oxynitrides such as SiO$_x$N$_y$ or AlO$_x$N$_y$ optionally doped using at least one other element,
- based on zinc tin oxide,
- based on titanium oxide.

Preferably, each coating comprises at least one dielectric layer consisting:
- of an aluminum and/or silicon nitride or oxynitride, or
- of a mixed zinc tin oxide, or
- of a titanium oxide.

These dielectric layers have a thickness:
- of less than or equal to 40 nm, of less than or equal to 30 nm or of less than or equal to 25 nm, and/or
- of greater than or equal to 5 nm, of greater than or equal to 10 nm or of greater than or equal to 15 nm.

The functional coatings of the invention may comprise dielectric layers having a stabilizing function. For the purposes of the invention, the term "stabilizing" means that the nature of the layer is selected so as to stabilize the interface between the functional layer and this layer. This stabilization results in the strengthening of the adhesion of the functional layer to the layers which frame it and, in fact, it will oppose the migration of its constituent material.

The dielectric layer or layers having a stabilizing function can be found directly in contact with a functional layer or separated by a blocking layer.

Preferably, the final dielectric layer of each dielectric coating located below a functional layer is a dielectric layer having a stabilizing function. This is because it is advantageous to have a layer having a stabilizing function, for example based on zinc oxide, below a functional layer as it facilitates the adhesion and the crystallization of the silver-based functional layer and increases its quality and its stability at high temperature.

It is also advantageous to have a layer having a stabilizing function, for example based on zinc oxide, above a functional layer in order to increase the adhesion thereof and to optimally oppose the diffusion on the side of the stack opposite the substrate.

The dielectric layer or layers having a stabilizing function can thus be above and/or below at least one functional layer or each functional layer, either directly in contact therewith or separated by a blocking layer.

Advantageously, each dielectric layer having a barrier function is separated from a functional layer by at least one dielectric layer having a stabilizing function.

The zinc oxide layer can optionally be doped using at least one other element, such as aluminum. The zinc oxide is crystalline. The layer based on zinc oxide comprises, in increasing order of preference, at least 90.0%, at least 92%, at least 95%, at least 98.0%, by weight of zinc, relative to the weight of elements other than oxygen in the layer based on zinc oxide.

Preferably, the dielectric coatings of the functional coatings comprise a dielectric layer based on zinc oxide located below and directly in contact with the silver-based metallic layer.

The zinc oxide layers have, in increasing order of preference, a thickness:
of at least 3.0 nm, of at least 4.0 nm, of at least 5.0 nm, and/or
of at most 25 nm, of at most 10 nm, of at most 8.0 nm.

The functional coating may optionally comprise an upper protective layer. The upper protective layer is preferably the final layer of the stack, that is to say the layer furthest from the substrate coated with the stack. These upper protective layers are regarded as included in the final dielectric coating. These layers generally have a thickness of between 2 and 10 nm, preferably 2 and 5 nm.

This protective layer may be chosen from a layer of titanium, of zirconium, of hafnium, of zinc and/or of tin, this or these metals being in the metal, oxide or nitride form. Advantageously, the protective layer is a layer of titanium oxide, a layer of zinc tin oxide or a layer based on titanium zirconium oxide.

A particularly advantageous embodiment relates to a substrate coated with a stack, defined starting from the transparent substrate, comprising:
a first dielectric coating comprising at least one layer having a barrier function and one dielectric layer having a stabilizing function,
optionally a blocking layer,
a first functional layer,
optionally a blocking layer,
a second dielectric coating comprising at least one dielectric layer having a stabilizing function and one layer having a barrier function,
optionally a protective layer.

Another particularly advantageous embodiment relates to a substrate coated with a stack defined starting from the transparent substrate, comprising:
a first dielectric coating comprising at least one layer having a barrier function and one dielectric layer having a stabilizing function,
optionally a blocking layer,
a first functional layer,
optionally a blocking layer,
a second dielectric coating comprising at least one lower dielectric layer having a stabilizing function, one layer having a barrier function and one upper dielectric layer having a stabilizing function,
optionally a blocking layer,
a second functional layer,
optionally a blocking layer,
a third dielectric coating comprising at least one dielectric layer having a stabilizing function and one layer having a barrier function,
optionally a protective layer.

Another particularly advantageous embodiment relates to a substrate coated with a stack defined starting from the transparent substrate, comprising:
a first dielectric coating comprising at least one layer having a barrier function and one dielectric layer having a stabilizing function,
optionally a blocking layer,
a first functional layer,
optionally a blocking layer,
a second dielectric coating comprising at least one lower dielectric layer having a stabilizing function, one layer having a barrier function and one upper dielectric layer having a stabilizing function,
optionally a blocking layer,
a second functional layer,
optionally a blocking layer,
a third dielectric coating comprising at least one lower dielectric layer having a stabilizing function, one layer having a barrier function and one upper dielectric layer having a stabilizing function,
optionally a blocking layer,
a third functional layer,
optionally a blocking layer,
a fourth dielectric coating comprising at least one dielectric layer having a stabilizing function and one layer having a barrier function,
optionally a protective layer.

The transparent substrates according to the invention are preferably made of a rigid inorganic material, for instance made of glass, or are organic, based on polymers (or made of polymer).

The transparent organic substrates according to the invention, which are rigid or flexible, can also be made of polymer. Examples of polymers suitable according to the invention comprise in particular:
polyethylene;
polyesters, such as polyethylene terephthalate (PET), polybutylene terephthalate (PBT) or polyethylene naphthalate (PEN);
polyacrylates, such as polymethyl methacrylate (PMMA);
polycarbonates;
polyurethanes;
polyamides;
polyimides;
fluoropolymers, for instance fluoroesters, such as ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);

photocrosslinkable and/or photopolymerizable resins, such as thiolene, polyurethane, urethane-acrylate or polyester-acrylate resins; and polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

The light transmission (LT) of the substrates of ordinary soda-lime glass type, without stack, is greater than 89%, preferably of 90%.

Ordinary clear glass of 4 to 6 mm thick has the following light characteristics:

a light transmission of between 89% and 91.5%, a light reflection of between 7% and 9.5%, a light absorption of between 0.3% and 3%.

According to a preferred embodiment, the substrate is made of glass, in particular soda-lime-silica glass, or of a polymeric organic substance.

The substrate advantageously has at least one dimension greater than or equal to 1 m, or 2 m and even 3 m. The thickness of the substrate generally varies between 0.5 mm and 19 mm, preferably between 0.7 and 9 mm, in particular between 2 and 8 mm, or between 4 and 6 mm. The substrate may be flat or curved, or even flexible.

The material, that is to say the substrate coated with the functional coating, can undergo a high-temperature heat treatment, such as an annealing, for example by a flash annealing, such as a laser or flame annealing, a tempering and/or a bending. The temperature of the heat treatment is greater than 400° C., preferably greater than 450° C. and better still greater than 500° C. The substrate coated with the functional coating may thus be bent and/or tempered.

The glazing is preferably chosen from multiple glazings, in particular a double glazing or a triple glazing.

According to advantageous embodiments, the glazing of the invention, in the form of a double glazing comprising the functional coating, positioned on face 2, makes it possible in particular to achieve the following performance results:

a solar factor g of less than or equal to 40%, less than 30%, preferably less than or equal to 29% and/or a light transmission, of between 25% and 70%, between 40% and 70%, between 40% and 60%, or between 50 and 60% and/or a high selectivity, in increasing order of preference, of at least 1.6, and/or a variable light reflection on the external side, in particular in certain applications of less than or equal to 25%, but for other applications of greater than or equal to 25%, and/or a light reflection, on the internal side, of less than or equal to 25%, preferably of less than or equal to 15%, and/or values of a* and b* in external reflection of, in increasing order of preference, between −5 and +5, between −4 and +4, between −3 and +3, between −2 and +2, between −1 and +1, and/or values of a* and b* in internal reflection of, in increasing order of preference, between −5 and +5, between −4 and +4, between −3 and +3, between −2 and +2, between −1 and +1, and/or values of a* and b* in transmission of, in increasing order of preference, between −5 and +5, between −4 and +4, between −3 and +3, between −2 and +2, between −1 and +1.

The details and advantageous characteristics of the invention emerge from the following nonlimiting examples.

EXAMPLES

I. Nature of the Layers and Coatings

Functional coatings defined below are deposited on substrates made of clear soda-lime glass with a thickness of 4 mm.

Functional metallic layers (FL) are layers of silver (Ag). The blocking layers are metallic layers made of alloy of nickel and of chromium (NiCr). Dielectric coatings of the functional coatings comprise barrier layers and stabilizing layers. The barrier layers are based on silicon nitride, doped with aluminum ($Si_3N_4$:Al) or based on mixed zinc tin oxide (SnZnOx). The stabilizing layers are made of zinc oxide (ZnO). The protective layers are made of titanium oxide (TiOx).

The absorbent layers of the absorbent color-adjustment coatings tested are metallic layers of nickel and chromium, metallic layers of tin and zinc, layers of zinc tin nitride, layers of niobium nitride, layers of titanium nitride.

The dielectric layers of the absorbent color-adjustment coatings comprise:

layers of silicon oxide corresponding to low-index layers, layers of titanium oxide and layers of silicon nitride corresponding to high-index layers.

The conditions for deposition of the layers, which were deposited by sputtering ("magnetron cathode" sputtering), are summarized in table 1.

TABLE 1

| | Target employed | Deposition pressure | Gas |
|---|---|---|---|
| $Si_3N_4$ | Si:Al at 92:8% by weight | $3.2 \times 10^{-3}$ mbar | 55% Ar/(Ar + $N_2$) |
| ZnO | Zn:Al at 98:2% by weight | $1.8 \times 10^{-3}$ mbar | 63% Ar/(Ar + $O_2$) |
| SnZnOx | Sn:Zn (60:40% by wt) | $1.5 \times 10^{-3}$ mbar | 39% Ar/(Ar + $O_2$) |
| TiO2 | Ti | $2 \times 10^{-3}$ mbar | 94% O2 |
| NiCr | Ni (80 at. %):Cr (20 at. %) | $2\text{-}3 \times 10^{-3}$ mbar | 100% Ar |
| Ag | Ag | $3 \times 10^{-3}$ mbar | 100% Ar |
| SiO2 | Si | $2 \times 10^{-3}$ mbar | 48% Ar |
| NbN | Nb | $2 \times 10^{-3}$ mbar | 60% Ar |
| SnZnN | Sn:Zn (60:40% by wt) | $1.5 \times 10^{-3}$ mbar | N2/(Ar + N2):10%-80% |
| TiN | Ti | $2 \times 10^{-3}$ mbar | N2/(Ar + N2):10%-80% |
| NiCrN | Ni (80 at. %):Cr (20 at. %) | $2\text{-}3 \times 10^{-3}$ mbar | N2/(Ar + N2):10%-80% |

At. = atomic

II. Absorbent Color-Adjustment Coatings

Table 2 below summarizes the characteristics linked to the thicknesses of the absorbent layers and of the dielectric layers constituting the dielectric coatings of the absorbent color-adjustment coatings.

The thicknesses of the absorbent layers and of the dielectric layers are physical thicknesses.

TABLE 2

| | Nature | CN1 | CN2 | CN3 | CN4 | CB1 | CBr1 | CN5 | CN6 | CN7 | CN8 |
|---|---|---|---|---|---|---|---|---|---|---|---|
| UDC | $Si_3N_4$ | — | 29.5 | 29 | — | — | — | — | — | — | 10 |
| | $SiO_2$ | 48.8 | — | — | 19.1 | 23.8 | 46 | — | — | — | — |
| | $TiO_2$ | — | — | — | — | — | — | 24.0 | 15.3 | 82.3 | — |
| AL 1 | SnZnN | — | 1.7 | — | — | — | — | — | — | — | — |
| | NbN | 1.5 | — | — | 8.4 | 4.8 | — | — | 1.7 | 2.0 | 11.5 |
| | NiCrN | — | — | 3.7 | — | — | — | — | — | — | — |
| | TiN | — | — | — | — | — | 13.4 | 7.3 | — | — | — |
| IntDC | $SiO_2$ | — | — | — | — | — | — | — | — | — | 57.4 |
| AL 2 | TiN | — | — | — | — | — | — | — | — | — | 27.8 |
| | $Si_3N_4$ | — | 9.5 | — | — | 13.9 | — | — | — | 6.4 | — |
| LDC | $SiO_2$ | 37.9 | 22.8 | 10.6 | — | 10.3 | — | 26.7 | 45 | — | 5 |
| | $TiO_2$ | — | — | 9.2 | — | 23.1 | — | — | 18.2 | — | — |
| | $SiO_2$ | — | — | — | — | 30 | — | — | — | — | — |
| | $TiO_2$ | — | — | — | — | 30 | 86.7 | 22.2 | — | — | — |
| | $Si_3N_4$ | 25.5 | 17.9 | — | 17.3 | — | — | — | — | — | — |
| SUB | PLC | 4 | 4 | 4 | 4 | 4 | 4 | 4 | 4 | 4 | 4 |

UDC = upper dielectric coating;
AL = absorbent layer;
IntDC = Intermediate dielectric coating;
LDC = Lower dielectric coating;
SUB = Substrate

III. Functional Coatings

Functional coatings conferring solar control properties were deposited by virtue of a magnetic-field-assisted (magnetron) cathode sputtering device.

The first functional coating, referred to hereinbelow as FC1, is an Ag bilayer, successively comprises, starting from the substrate, an alternation of two silver layers (metallic functional layers) and of three dielectric coatings, each dielectric coating comprising at least one dielectric layer, so that each metallic functional layer is positioned between two dielectric coatings. The total thickness of this functional coating is between 150 and 200 nm.

The second functional coating, referred to hereinbelow as FC2, is an Ag bilayer, comprises a stack successively comprising, starting from the substrate, an alternation of two silver layers and of three dielectric coatings, each dielectric coating comprising several dielectric layers, so that each silver layer is positioned between two dielectric coatings. The total thickness of this functional coating is between 150 and 200 nm.

The third functional coating, referred to hereinbelow as FC3, is an Ag trilayer, successively comprises, starting from the substrate, an alternation of three silver layers (metallic functional layers) and of four dielectric coatings, each dielectric coating comprising at least one dielectric layer, so that each metallic functional layer is positioned between two dielectric coatings. The total thickness of this functional coating is between 200 and 250 nm.

Table 3 below lists the main optical characteristics of materials comprising a transparent substrate, one of the faces of which is coated with one of the functional coatings FC1, FC2 or FC3 assembled in the form of double glazings with a 6/16/4 structure: 6 mm glass/16 mm interlayer space filled with 90% argon and 10% air/4 mm glass, the functional coating being positioned on face 2.

IV. Configuration of the Double Glazings and Laminated Glazings

The materials comprising a transparent substrate, of which one of the faces of the substrate is coated with a functional coating, were assembled in the form of double glazing or in the form of laminated glazing.

The double glazings, hereafter "DGU" configuration, have a 6/16/4 structure: 6 mm glass/16 mm interlayer space filled with 90% argon and 10% air/4 mm glass, the functional coating being positioned on face 2. The absorbent color-adjustment coating of the invention when it is present is positioned on face 1 or on face 3.

The laminated glazings, hereinafter "Lam" configuration, have a structure of first substrate/sheet(s)/second substrate type. The functional coating is positioned on face 2 and the absorbent color-adjustment coating is positioned on face 1 or 3.

V. "Solar Control" and Colorimetry Performance

Table 3 below lists the main optical characteristics of materials comprising a transparent substrate, one of the faces of which is coated with a functional coating, which materials are assembled in the form of multiple glazing or laminated glazing, and optionally an absorbent color-adjustment coating.

TABLE 3

| | | | CN | | FC | | | | | | | | | | | | |
|---|---|---|---|---|---|---|---|---|---|---|---|---|---|---|---|---|---|
| Material | Conf. | Position | Nature | Position | Nature | LT % | a*T | b*T | Rext % | a*Rext | b*Rext | Rint % | a*int | b*int | g | s |
| Ref. 1 | DGU | | None | Face 2 | FC1 | 70 | −4.5 | 3 | 13 | −2.0 | −9.5 | 15 | 1.0 | −1.0 | 37 | 1.9 |
| Ref. 2 | DGU | | None | Face 2 | FC2 | 52 | −10.5 | −1.5 | 18 | −3.0 | −9.1 | 23 | 9.4 | 4.0 | 28 | 1.9 |
| Ref. 3 | DGU | | None | Face 2 | FC3 | 47 | −8.5 | 1 | 16 | −5 | −9 | 18 | −11 | −10 | 21 | 2.2 |
| Inv. 1 | DGU | Face 1 | CN1 | Face 2 | FC1 | 60 | −4.2 | 2.1 | 14 | −0.8 | −2.2 | 15 | −0.2 | 1.3 | 34 | 1.8 |
| Inv. 2 | DGU | Face 1 | CN2 | Face 2 | FC1 | 52 | −4 | −0.4 | 18 | −0.1 | −2.3 | 18 | −1.4 | 0.8 | 30 | 1.7 |
| Inv. 3 | DGU | Face 1 | CN3 | Face 2 | FC1 | 41 | −3.3 | 0.8 | 19 | −0.5 | −2 | 19 | −2.0 | −0.9 | 24 | 1.7 |
| Inv. 4 | DGU | Face 1 | CN4 | Face 2 | FC1 | 32 | −3.4 | −0.4 | 25 | 0.29 | −1.6 | 17 | −0.8 | −0.17 | 19 | 1.6 |
| Inv. 5 | DGU | Face 1 | CB1 | Face 2 | FC1 | 42 | −3 | 2.3 | 21 | −4 | −15.8 | 16 | −2.5 | −2 | 25 | 1.7 |
| Inv. 6 | DGU | Face 1 | CBR1 | Face 2 | FC1 | 41 | −6 | 3 | 18 | 13.5 | 16 | 17 | 1.9 | 2.85 | 23 | 1.8 |
| Inv. 7 | DGU | Face 3 | CN5 | Face 2 | FC1 | 53 | −4.8 | 0.9 | 20 | −2.7 | −1.9 | 15 | 0 | 0.5 | 30 | 1.8 |

TABLE 3-continued

|  |  | CN |  | FC |  |  |  |  |  |  |  |  |  |  |  |  |
|---|---|---|---|---|---|---|---|---|---|---|---|---|---|---|---|---|
| Material | Conf. | Position | Nature | Position | Nature | LT % | a*T | b*T | Rext % | a*Rext | b*Rext | Rint % | a*int | b*int | g | s |
| Inv. 8 | Lam. | Face 1 | CN6 | Face 2 | FC1 | 55 | −5.5 | 2.3 | 19.2 | −3.6 | 0.2 | 15.1 | 0.8 | −7.4 | 36 | 1.5 |
| Inv. 9 | Lam. | Face 3 | CN7 | Face 2 | FC1 | 53 | −5.7 | 2.5 | 19.9 | −4.5 | −8.1 | 16.7 | 2.0 | 1.7 | 33.8 | 1.6 |
| Inv. 10 | DGU | Face 1 | CN8 | Face 2 | FC3 | 5 | −6 | 0.4 | 19 | −0.2 | −1.5 | 20 | −8.8 | −7.4 | 5 | 1.0 |

By comparing Inv.2 and Ref.1, it is observed that, starting from a functional coating with high LT (Ref. 1 with FC1), a glazing is obtained that has a light transmission and internal and external reflection that are close to those of a glazing having a medium LT (Ref. 2 with FC2) but with much more neutral colors.

It is also possible by means of the invention to adjust the LT. Indeed, starting from a glazing comprising a functional coating with high LT (Ref. 1 with FC1), a range of glazing with no restriction of LT, for example between 60% and 30% (Inv. 1 to Inv. 4) is obtained while maintaining an excellent neutrality.

It is also possible by means of the invention to adjust the reflection colors and to obtain, starting from a glazing comprising a functional coating with high LT (Ref. 1 with FC1), a whole range of glazing having any color, in particular blue, bronze or neutral, as can be seen in table 4.

TABLE 4

| Mat. | CN | FL | LT | Rext | a*Rext | b*Rext | Color in reflection |
|---|---|---|---|---|---|---|---|
| Inv. 3 | CN3 | FC1 | 41 | 19 | −0.5 | −2 | Neutral |
| Inv. 5 | CB1 | FC1 | 42 | 21 | −4 | −15.8 | Blue |
| Inv. 6 | CBR1 | FC1 | 41 | 18 | 13.5 | 16 | Bronze |

The neutralization layer can be placed on any face of the glazing without a functional coating, such as for example face 1 (Inv. 1 to 6) or face 3 (Inv. 7).

The material can be installed in DGU configuration (Inv. 1 to 7) or laminated configuration (Inv. 8 and Inv. 9) or any other configuration (triple glazing, laminated double glazing, etc.).

The invention is not restricted to the use of stacks with high LT as functional coatings, nor to functional coatings with two silver layers. Inv. 10 shows for example the case of a glazing with very low LT (5%) obtained according to the invention using a functional coating with three silver layers of intermediate light transmission (50%).

The invention claimed is:

1. A material comprising one or more transparent substrates, each transparent substrate comprising two main faces, wherein:
one of the two main faces of one of the transparent substrates is coated with a functional coating which has an effect on solar radiation and/or infrared radiation and comprises at least one silver-based metallic functional layer, each silver-based metallic functional layer being positioned between two dielectric coatings, and
a main face of the one or more transparent substrates that is not coated with the functional coating has deposited thereupon an absorbent color-adjustment coating comprising, starting from the substrate:
a lower dielectric coating,
an absorbent layer which absorbs solar radiation in the visible part of the spectrum, and
an upper dielectric coating,
wherein the lower dielectric coating comprises a sequence of at least two dielectric layers, a variation in refractive index of which is greater than 0.2 and with the dielectric layer having the higher refractive index being located in direct contact with the substrate and having a refractive index greater than 2.10,
wherein the absorbent layer has a first main face and a second main face that is opposite the first main face and each of the first main face and the second main face of the absorbent layer is in contact with a dielectric layer,
wherein the functional coating and the absorbent color-adjustment coating are separated from each other by at least a gas-filled space, an interlayer or at least one transparent substrate, and
wherein the absorbent layer is based on a metal, metalloid, nitride, or oxynitride of an element selected from the group consisting of palladium, niobium, tungsten, iron, titanium, molybdenum, zirconium, nickel, tantalum, zinc, tin and silicon, wherein the content of the element as a proportion of all metallic elements contained in the absorbent layer is at least 70%.

2. The material as claimed in claim 1, wherein the absorbent layer is a layer made of a material having an n/k ratio between 0 and 5, excluding these values, over at least 60% of the wavelength range of the visible region.

3. The material as claimed in claim 1, wherein the light absorption due to the absorbent layer, measured on the glass side by depositing only the absorbent layer enclosed between two non-absorbent dielectric layers on ordinary clear glass of 4 mm to 6 mm thick, measured, is greater than 5%.

4. The material as claimed in claim 1, wherein the absorbent layer is chosen from a layer of nickel nitride, a layer of titanium nitride, a layer of niobium nitride or a layer based on silicon.

5. The material as claimed in claim 1, wherein the absorbent layer has a thickness of between 0.1 and 20 nm.

6. The material as claimed in claim 1, wherein the absorbent color-adjustment coating comprises, starting from the substrate:
the lower dielectric coating,
the absorbent layer,
an intermediate dielectric coating,
a second absorbent layer,
an upper dielectric coating.

7. The material as claimed in claim 1, wherein the refractive index is greater than 2.20.

8. The material as claimed in claim 1, wherein the lower dielectric coating comprises a sequence of at least two dielectric layers, including:
a low-index layer having a refractive index of less than 1.75, and
a high-index layer having a refractive index of greater than 2.10.

9. The material as claimed in claim 6, wherein the upper or intermediate dielectric coating comprises a high-index layer having a refractive index of greater than 1.85 and/or a low-index layer having a refractive index of less than 1.75.

10. The material as claimed in claim 1, wherein the transparent substrate coated with the functional coating is made of glass or of a polymeric organic substance.

11. The material as claimed in claim 1, wherein the absorbent color-adjustment coating is positioned on face 1 and the functional coating which has an effect on solar radiation and/or infrared radiation is positioned on face 2.

12. The material as claimed in claim 1, comprising at least two color-adjustment coatings comprising an absorbent layer, each located on different faces of one of the substrates, excluding the face(s) coated with the functional coating.

13. The material as claimed in claim 1, wherein the dielectric layer having the higher refractive index is titanium oxide or a mixed oxide of titanium and another component selected from the group consisting of Zn, Zr and Sn, or zirconium oxide or niobium oxide or a mixed nitride of silicon and zirconium, or a mixed nitride of silicon, zirconium and aluminum.

14. The material as claimed in claim 1, wherein:
the functional coating which has an effect on solar radiation and/or infrared radiation and comprises at least one silver layer, and
the absorbent color-adjustment coating and the functional coating are located on opposing surfaces of the same transparent substrate.

15. The material as claimed in claim 14, wherein the dielectric layer having the higher refractive index is titanium oxide or a mixed oxide of titanium and another component selected from the group consisting of Zn, Zr and Sn, or zirconium oxide or niobium oxide or a mixed nitride of silicon and zirconium, or a mixed nitride of silicon, zirconium and aluminum.

16. A glazing comprising a material as claimed in claim 1, wherein the glazing is in the form of monolithic, laminated and/or multiple glazing.

17. The glazing as claimed in claim 16, wherein the glazing is a multiple glazing, wherein when the material is fitted in a double glazing with the functional coating positioned on face 2, the double glazing has:
a light transmission of between 40% and 60%,
values of a* and b* in external reflection of between −5 and +5,
values of a* and b* in internal reflection of between −5 and +5,
values of a* and b* in transmission of between −5 and +5.

18. The glazing as claimed in claim 16, wherein the glazing is a multiple glazing, wherein when the material is fitted in a double glazing with the functional coating positioned on face 2, the double glazing has:
values of a* in external reflection of between −10 and −3,
values of b* in external reflection of between −20 and −10.

19. The glazing as claimed in claim 16, wherein the glazing is a multiple glazing, wherein when the material is fitted in a double glazing with the functional coating positioned on face 2, the double glazing has values of a* and b* in external reflection of between 5 and 20.

20. The glazing as claimed in claim 16, wherein the glazing is a multiple glazing, the glazing comprising said material and at least one additional substrate, wherein the material and the additional substrate are separated by at least one intermediate gas-filled space.

21. The glazing as claimed in claim 16, wherein the glazing is a laminated glazing, the glazing comprising said material and at least one additional substrate, the material and the at least one additional substrate are separated by at least one lamination interlayer.

22. The glazing as claimed in claim 16, wherein the glazing is a laminated and multiple glazing, the glazing comprising said material and at least two additional substrates corresponding to a second substrate and a third substrate, the material and the third substrate are separated by at least one intermediate gas-filled space, and wherein
the material and the second substrate or
the second substrate and the third substrate,
are separated by at least one lamination interlayer.

23. The glazing as claimed in claim 16, wherein the glazing is a multiple and/or multiple laminated glazing, and wherein the absorbent color-adjustment coating is positioned on face 1 and the functional coating which can have an effect on solar radiation and/or infrared radiation is positioned on face 2 or 3.

24. A material, comprising:
a transparent substrate comprising two main faces, of which one of the two main faces of the substrate is coated with a functional coating which has an effect on solar radiation and/or infrared radiation and comprises at least one silver-based metallic functional layer, each silver-based metallic functional layer being positioned between two dielectric coatings, and an additional transparent substrate comprising at least two main faces,
wherein:
at least one main face (a) of the transparent substrate, which at least one main face is not coated with the functional coating, or (b) of the additional transparent substrate, comprises an absorbent color-adjustment coating comprising, starting from said transparent substrate or said additional transparent substrate:
a lower dielectric coating,
an absorbent layer which absorbs solar radiation in the visible part of the spectrum,
an upper dielectric coating,
wherein the lower dielectric coating comprises a sequence of at least two dielectric layers, a variation in refractive index of which is greater than 0.2 and with the dielectric layer having the higher refractive index being located in direct contact with the substrate and having a refractive index greater than 2.10, and
wherein the absorbent layer has a first main face and a second main face that is opposite the first main face and each of the first main face and the second main face of the absorbent layer is in contact with a dielectric layer,
said at least one main face is chosen from:
the other main face of the two main faces of the transparent substrate coated with the functional coating, or
one of the two main faces of the additional transparent substrate such that the functional coating and the absorbent color-adjustment coating are separated from each other by at least a gas-filled space, an interlayer or at least one transparent substrate,
wherein the absorbent layer is based on a metal, metalloid, nitride, or oxynitride of an element selected from the group consisting of palladium, niobium, tungsten, iron, titanium, molybdenum, zirconium, nickel, tantalum, zinc, tin and silicon, wherein the content of the element as a proportion of all metallic elements contained in the absorbent layer is at least 70%.

25. The material as claimed in claim 24, wherein the dielectric layer having the higher refractive index is titanium oxide or a mixed oxide of titanium and another component selected from the group consisting of Zn, Zr and Sn, or zirconium oxide or niobium oxide or a mixed nitride of silicon and zirconium, or a mixed nitride of silicon, zirconium and aluminum.

\* \* \* \* \*